(12) United States Patent
Xu et al.

(10) Patent No.: US 11,166,443 B2
(45) Date of Patent: Nov. 9, 2021

(54) FOLDABLE DIP NET PROVIDED WITH HANDLE AND METHOD FOR USING SAME

(71) Applicant: HANGZHOU FUFAN INDUSTRY CO., LTD., Hangzhou (CN)

(72) Inventors: Hongjian Xu, Hangzhou (CN); Shu Lin, Hangzhou (CN); Linrong Hong, Hangzhou (CN); Huihai Ge, Hangzhou (CN)

(73) Assignee: HANGZHOU FUFAN INDUSTRY CO., LTD., Hangzhou (CN)

(*) Notice: Subject to any disclaimer, the term of this patent is extended or adjusted under 35 U.S.C. 154(b) by 231 days.

(21) Appl. No.: 16/234,474

(22) Filed: Dec. 27, 2018

(65) Prior Publication Data
US 2020/0163318 A1    May 28, 2020

(30) Foreign Application Priority Data
Nov. 26, 2018    (CN) .......................... 201811416696.0

(51) Int. Cl.
| | |
|---|---|
| *A01K 77/00* | (2006.01) |
| *F21V 23/00* | (2015.01) |
| *F21V 23/02* | (2006.01) |
| *F21V 23/04* | (2006.01) |
| *F21V 33/00* | (2006.01) |
| *F21Y 115/10* | (2016.01) |
| *F21V 31/00* | (2006.01) |

(52) U.S. Cl.
CPC ............ *A01K 77/00* (2013.01); *F21V 23/003* (2013.01); *F21V 23/02* (2013.01); *F21V 23/04* (2013.01); *F21V 33/008* (2013.01); *F21V 31/00* (2013.01); *F21Y 2115/10* (2016.08)

(58) Field of Classification Search
CPC ........ A01K 77/00; A01K 74/00; A01K 75/00; F21V 23/008; F21V 23/003
See application file for complete search history.

(56) References Cited

U.S. PATENT DOCUMENTS

| | | | | |
|---|---|---|---|---|
| 1,857,826 | A * | 5/1932 | Slamen | A01K 77/00 43/12 |
| 2,567,059 | A * | 9/1951 | Deeble | A01K 77/00 43/12 |
| 2,984,038 | A * | 5/1961 | Chapralis | A01K 77/00 43/12 |
| 4,031,650 | A * | 6/1977 | Popeil | A01K 77/00 43/12 |

(Continued)

OTHER PUBLICATIONS

Frabill Trophy Haul Net| iCast2018 (Jul. 13, 2018) https://www.youtube.com/watch?v=kTk3CYku6-c (Year: 2018).*

*Primary Examiner* — Magdalena Topolski
*Assistant Examiner* — Shada Mohamed Alghailani
(74) *Attorney, Agent, or Firm* — Jiwen Chen; Jacobson Holman PLLC (57) ABSTRACT

A foldable dip net includes a handle, a connector and a net rack, wherein the handle comprises a U-shaped support connected with a handle lever and an arm rest plate; the connector has a mounting base body and a lock structure, and a light-emitting unit is arranged in the mounting base body; the net rack is hinged to the mounting base body through a rotary pin, and a clamping groove is formed in the side wall of the rotary pin and is matched with the lock structure.

1 Claim, 7 Drawing Sheets

(56) References Cited

U.S. PATENT DOCUMENTS

| | | | | |
|---|---|---|---|---|
| 4,745,703 | A | * | 5/1988 | Walter .................... A01K 69/00 43/14 |
| D301,600 | S | * | 6/1989 | Wilson ......................... D22/135 |
| 5,018,295 | A | * | 5/1991 | Taylor, IV ............. A01K 73/06 43/14 |
| 5,339,556 | A | * | 8/1994 | Boehm .................. A01K 77/00 43/11 |
| 5,471,778 | A | * | 12/1995 | Marfori .................. A01K 77/00 43/12 |
| 5,568,697 | A | * | 10/1996 | Schwartz ............... A01K 77/00 43/12 |
| 6,101,756 | A | * | 8/2000 | Baker .................... A01K 77/00 43/12 |
| 6,389,733 | B1 | * | 5/2002 | Presnell ................. A01K 77/00 43/12 |
| 8,040,066 | B1 | * | 10/2011 | Girch, Jr. ............ F21V 33/0008 315/33 |
| 2005/0005497 | A1 | * | 1/2005 | Boltan ................. A01K 87/007 43/7 |
| 2009/0255166 | A1 | * | 10/2009 | Lu ......................... A01K 77/00 43/12 |
| 2009/0293337 | A1 | * | 12/2009 | Arita ...................... A01K 77/00 43/8 |
| 2012/0091174 | A1 | * | 4/2012 | Breeze .................. A01K 77/00 224/222 |
| 2012/0186133 | A1 | * | 7/2012 | Smith .................... A01K 77/00 43/12 |
| 2017/0049085 | A1 | * | 2/2017 | Williford ............... A01K 77/00 |
| 2019/0335732 | A1 | * | 11/2019 | Daigler ................. A44B 19/32 |
| 2019/0335736 | A1 | * | 11/2019 | Makos ................. A01K 97/125 |

\* cited by examiner

FOLDABLE DIP NET PROVIDED WITH HANDLE AND METHOD FOR USING SAME

This application claims the priority benefit of Chinese Application No. 2018114166960, filed Nov. 26, 2018, which is hereby incorporated by reference.

BACKGROUND OF THE INVENTION

1. Technical Field

The present invention relates to the field of fishing gear, in particular to a foldable dip net provided with a handle and particularly suitable for fly fishing and a method for using the foldable dip net provided with the handle.

2. Description of Related Art

Fly fishing is usually adopted by senior fishing enthusiasts to catch small predacious fish from lakes, reservoirs, rivers or brooks at the end of the spring and the beginning of the summer (from March to April) every year when winged zooplankton becomes adults by means of the characteristic that the predacious fish catch food intuitively and do not determine whether or not the food is swallowable until placing the food in the mouth. Fly fishing creates a false impression that winged insects such as flies, mosquitoes, dragonflies, butterflies and moths fall into water with bionic bait (artificial bait) to stimulate predacious fish such as hemiculter leucisculus, cutter alburnus and red-tail xenocypris to catch.

When fly fishing is used for catching fish, hooked fish should be scooped in time so as to be prevented from escaping. There are typically two types of dip nets at present: fishing dip net rod disclosed by Chinese Patent Application No. 201721784054.7 and an internal triangular foldable dip net disclosed by Chinese Patient Application No. 201420376912.4, the dip nets in both patents are composed of a dip net rod and a net rack, and the dip net rod in the prior art is a straight rod.

As for fly fishing completed in air, if the straight dip net rod is adopted, it will be very difficult for the fishing enthusiasts to scoop fish by holding the fish net rod due to the large force; the angle of the straight dip net rod is difficult to control in the fish scooping process, and consequentially, the fishing enthusiasts may miss the optimal fish scooping opportunity and hooked fish escape again.

BRIEF SUMMARY OF THE INVENTION

To overcome the defects of the prior art, the present invention provides a foldable dip net which is provided with a handle, allows users to apply forces more reasonably and to control the fish scooping angle more easily and is more suitable for fly fishing, and also provides a method for using the foldable dip net provided with the handle.

For the sake of a brief description of this application, the applicant omits 'string bag' in the following text description, and the string bag is not shown in the figures either. Those skilled in this field would appreciate that the string bag should be attached to or mounted on the net rack when the foldable dip net in this patent application is used.

To fulfill the above objects, the following technical solution is provided by the present invention:

The present invention relates to a foldable dip net provided with a handle. The foldable dip net comprises a handle, a connector and a net rack, wherein the handle comprises a U-shaped support, a handle lever is arranged at the front end of the U-shaped support, and an arm rest plate is arranged at the tail end of the U-shaped support; the connector comprises a mounting base body fixed to the forefront the U-shaped support, and a lock structure is arranged on the mounting base body; and the tail end of the net rack is hinged to the mounting base body through a rotary pin, a clamping groove matched with the lock structure is formed in the side wall of the rotary pin, and the net rack is locked on the mounting base body through the lock structure.

Preferably, the lock structure comprises a buckle plate, wherein the middle of the buckle plate is hinged to the mounting base body through a rotary shaft, a reset spring and a bolt are arranged on the bottom surface of the buckle plate and are separately located on the front side and the rear side of the rotary shaft, the reset spring has two ends separately making contact with the buckle plate and the mounting base body, and the bolt has a top fixed to the bottom surface of the buckle plate and a bottom matched with the clamping groove.

Preferably, a plurality of rotary pin bearing seats are arranged in the mounting base body side by side at intervals, semicircular holes matched with the rotary pin are formed in the rotary pin bearing seats, and the rotary pin is mounted in the semicircular holes.

Preferably, a light-emitting unit is arranged in the mounting base body and comprises a battery, a control switch and an LED lamp, wherein the LED lamp is fixed to the forefront of the mounting base body, the control switch is arranged on the upper surface of the mounting base body, the battery is mounted in the mounting base body, and the battery, the control switch and the LED lamp are sequentially connected through a wire.

Preferably, a battery case is arranged in the mounting base body and is provided with a battery case cover plate, wherein the battery case cover plate is located at the bottom of the mounting base body and is fixed to the mounting base body with screws, and the battery is mounted in the battery case.

Preferably, the arm rest plate is of an arc-shaped structure with the middle concave downwards.

Preferably, a hanging plate is arranged behind the arm rest plate and is provided with a through hole allowing a sling to penetrate through.

Preferably, the light-emitting unit further comprises a control chip used for controlling the brightness of the LED lamp, and the control chip is connected between the control switch and the LED lamp.

Preferably, the battery is an instrument battery and supplies voltage-reduced power to the LED lamp.

A method for using the foldable dip net provided with the handle comprises the following steps: locking the net rack by the lock structure after the net rack is unfolded, holding the handle lever from below with the palm facing upwards and the back of the arm leaning against the upper surface of the arm rest plate, and applying an acting force to the dip net provided with the handle.

By adoption of the above technical solution, the present invention has the following beneficial effects over the prior art:

1. When the foldable dip net provided with the handle is used for scooping fish, the user holds the handle lever from below with the palm facing upwards and the back of the arm leaning against the upper surface of the arm rest plate and then applies an acting force to the net rack under the combined effect of the wrist and the arm, and according to the lever principle, fish can be scooped more effortlessly, the fish scooping angle can be controlled more easily, and fish can be scooped more accurately.

2. The net rack of the foldable dip net provided with the handle is connected with the connector in a hinged manner, and the lock structure used for locking the net rack is arranged on the connector, so that when stored, the foldable dip net provided with the handle can be folded to reduce the size; and when used, the net rack is unfolded and is locked by the lock structure to be prevented from rotating.

3. The foldable dip net is provided with the light-emitting unit, and when fishing at night, the user can turn on the LED lamp to clearly see the condition under water and to attract fish.

4. The arm rest plate is of an arc-shaped structure matched with the contour of the arm, so that the contact area between the arm and the arm rest plate is enlarged, and the user feels more comfortable and is protected against arm pains.

5. The hanging plate is arranged at the end of the handle and is provided with a hook so that when not used, the net rack can be folded to reduce the size and can be hung on fishing wear with the hook, thereby being convenient to store and use.

DETAILED DESCRIPTION OF THE EMBODIMENTS OF THE INVENTION

For a better understanding of the present invention, the present invention is expounded below with reference to embodiments. The following embodiments are used to explain the present invention, but are not intended to limit the scope of the present invention.

For the sake of a brief description of this application, the applicant omits 'string bag' in the following text description, and the string bag is not shown in the figures either. But those skilled in this field would appreciate that the string bag should be attached to or mounted on the net rack when the foldable dip net in this patent application is used.

Figure 1:
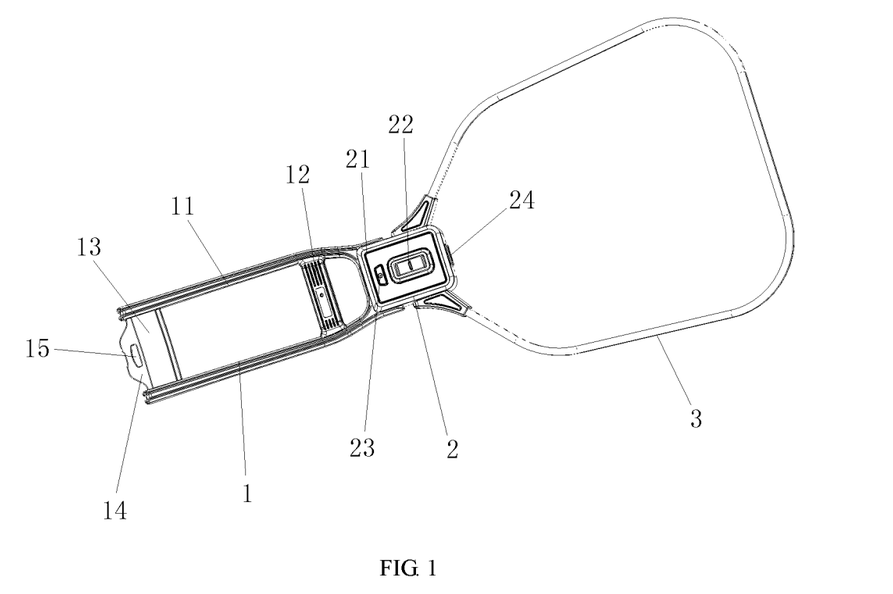
FIG. 1 is a structural view of a foldable dip net provided with a handle of the present invention.
Figure 2:
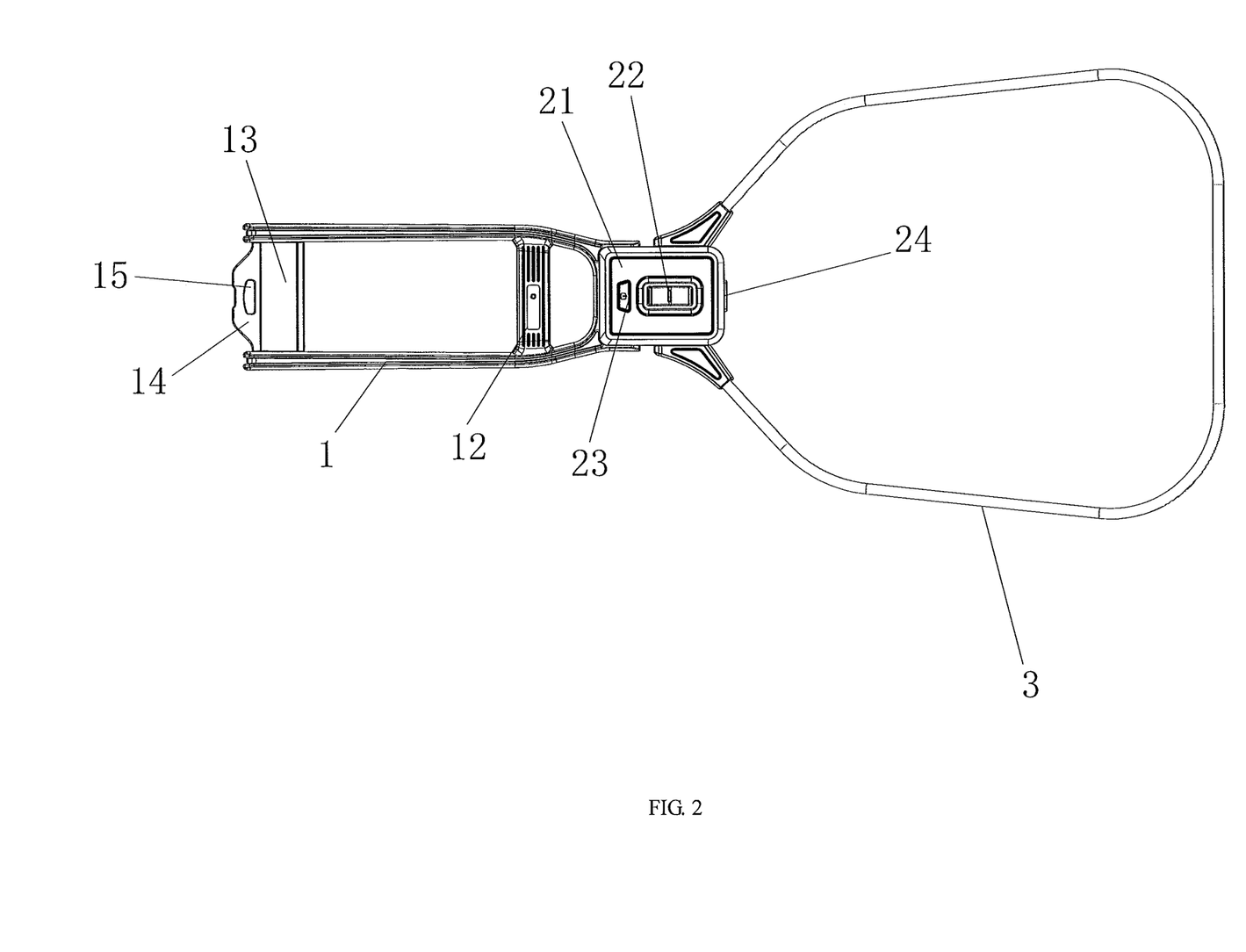
FIG. 2 is a top view of the foldable dip net provided with the handle of the present invention.
Figure 3:
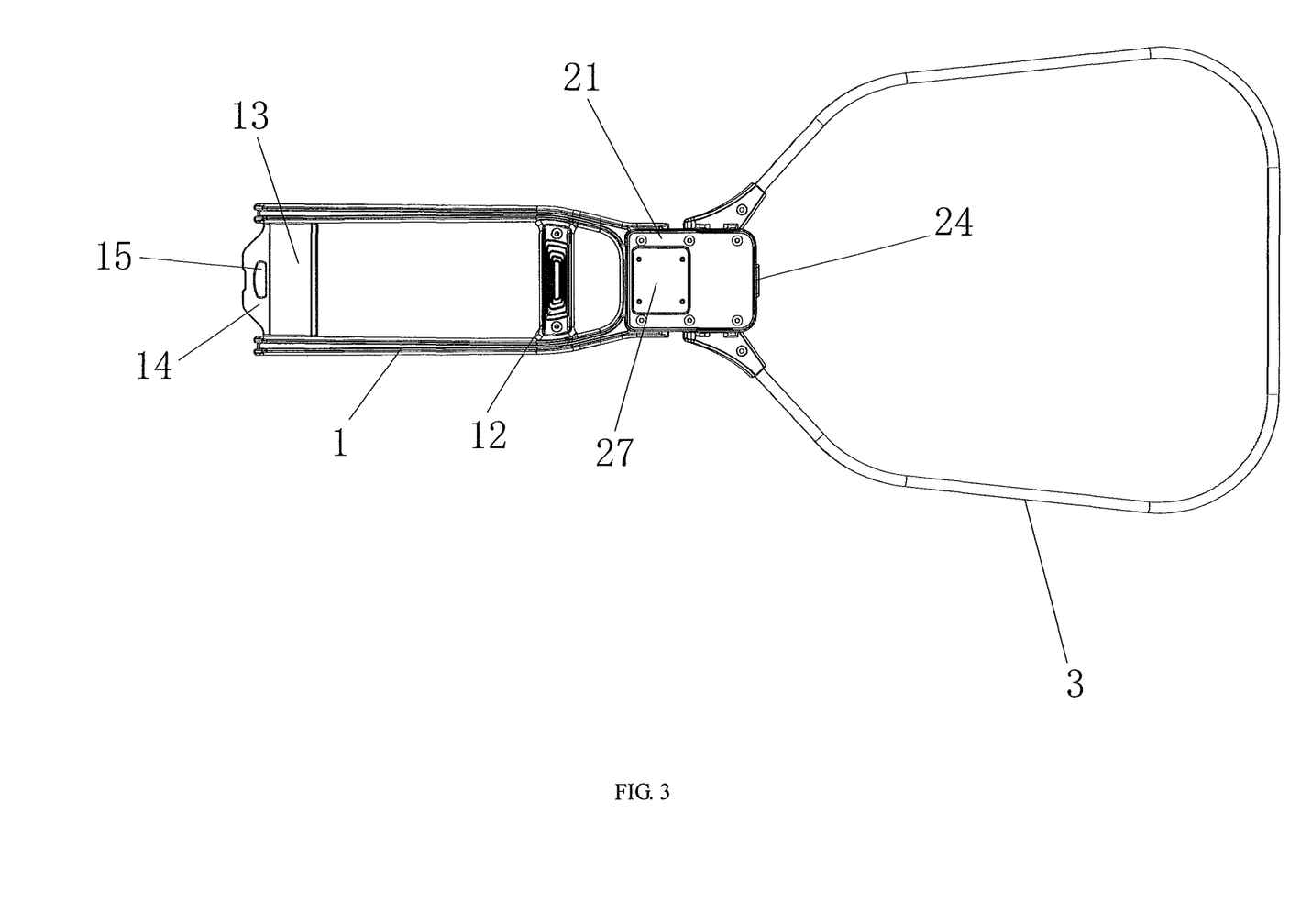
FIG. 3 is a rear view of the foldable dip net provided with the handle of the present invention.

As shown in FIGS. 1-3, a foldable dip net provided with a handle comprises a handle 1, a connector 2 and a net rack 3. The handle comprises a U-shaped support 11. A handle lever 12 is arranged at the front end of the U-shaped support 11 and has two ends separately fixed to inner walls of rod pieces on two sides of the U-shaped support 11. An arm rest plate 13 is arranged at the tail end of the U-shaped support 11 and is of an arc-shaped structure with the middle concave downwards. A hanging plate 14 is arranged behind the arm rest plate 13 and is provided with a through hole 15 allowing a sling to penetrate through. The sling and a hook (not shown) are tied at the through hole. When not used, the foldable dip net provided with the handle can be hung on fishing wear through the hook and the sling.

Figure 4:
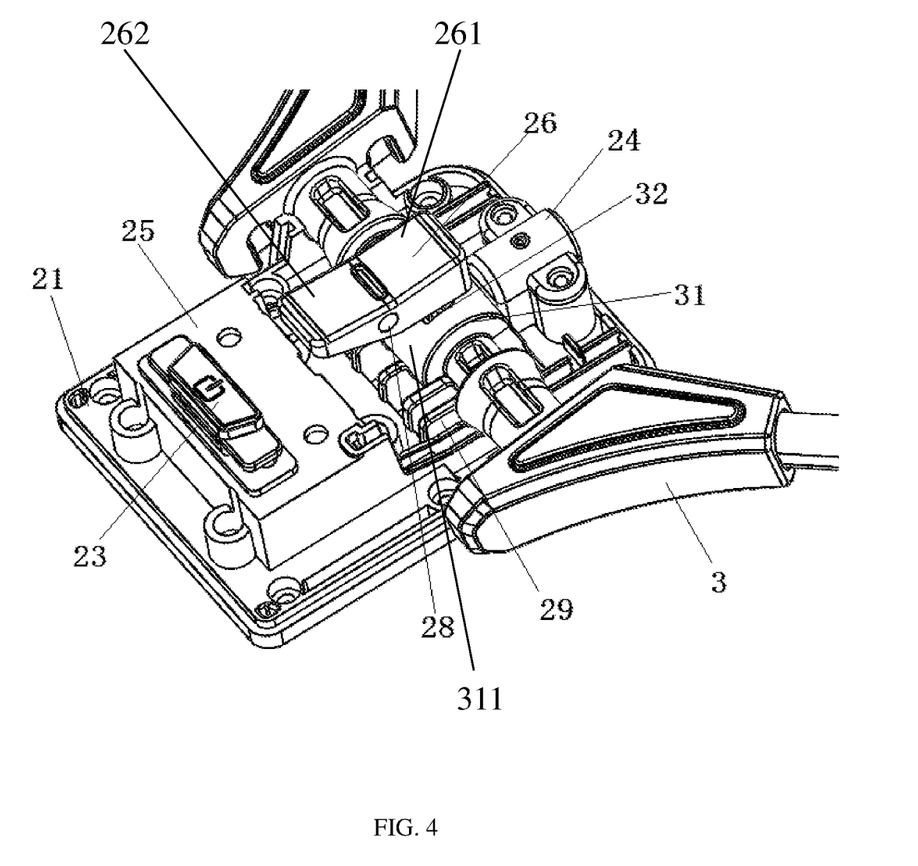
FIG. 4 is an internal view of a mounting base body of a connector after a cover plate at the top is removed.
Figure 5:
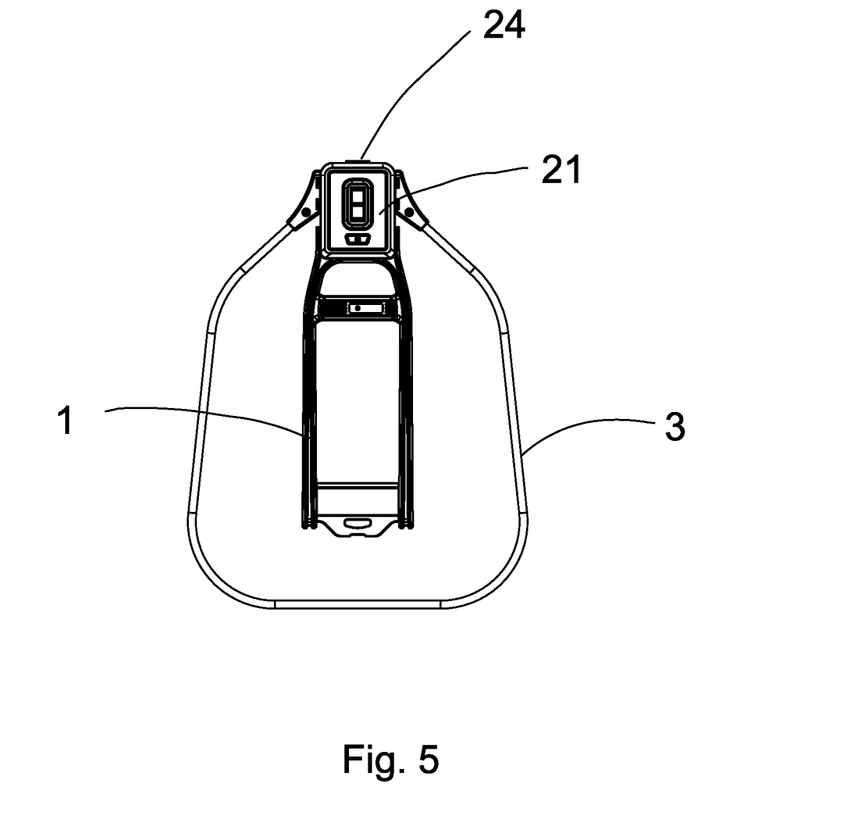
FIG. 5 is a top view of a foldable dip net provided with a handle of the present invention that is folded.
Figure 6:
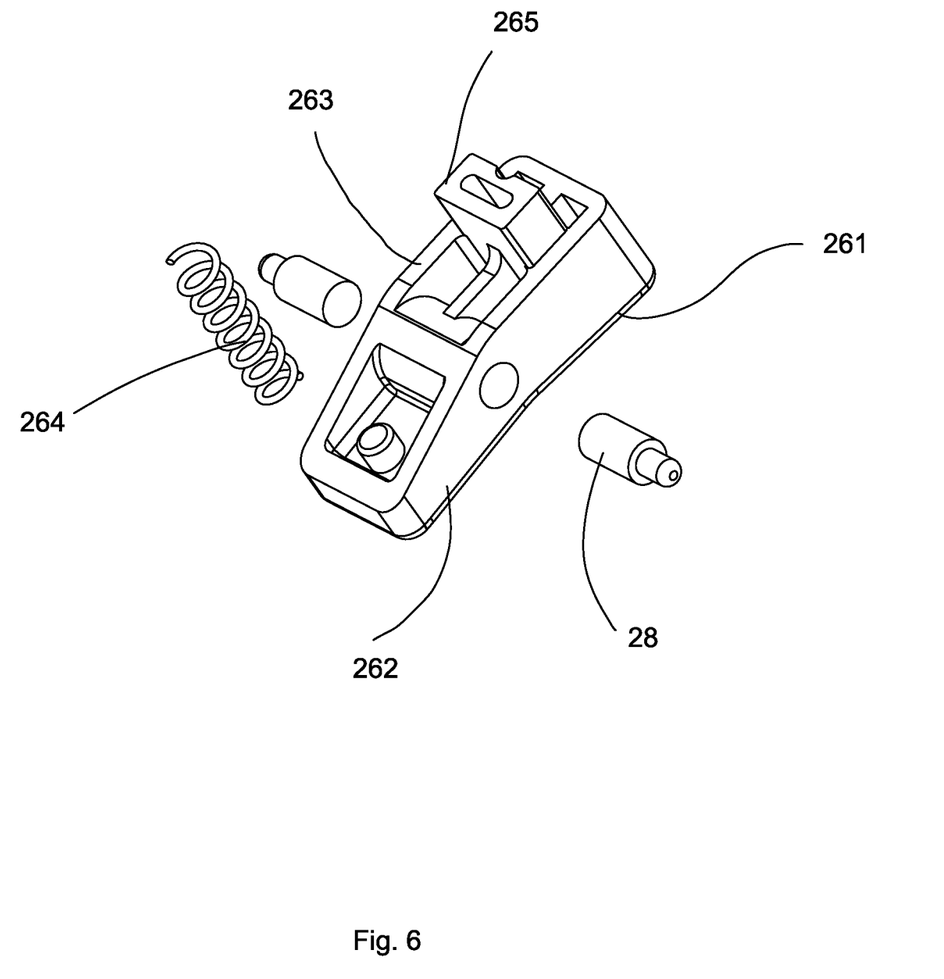
FIG. 6 is a bottom perspective view of a buckle plate of the lock structure wherein a reset spring and a bolt are arranged on the bottom surface of the buckle plate.
Figure 7:
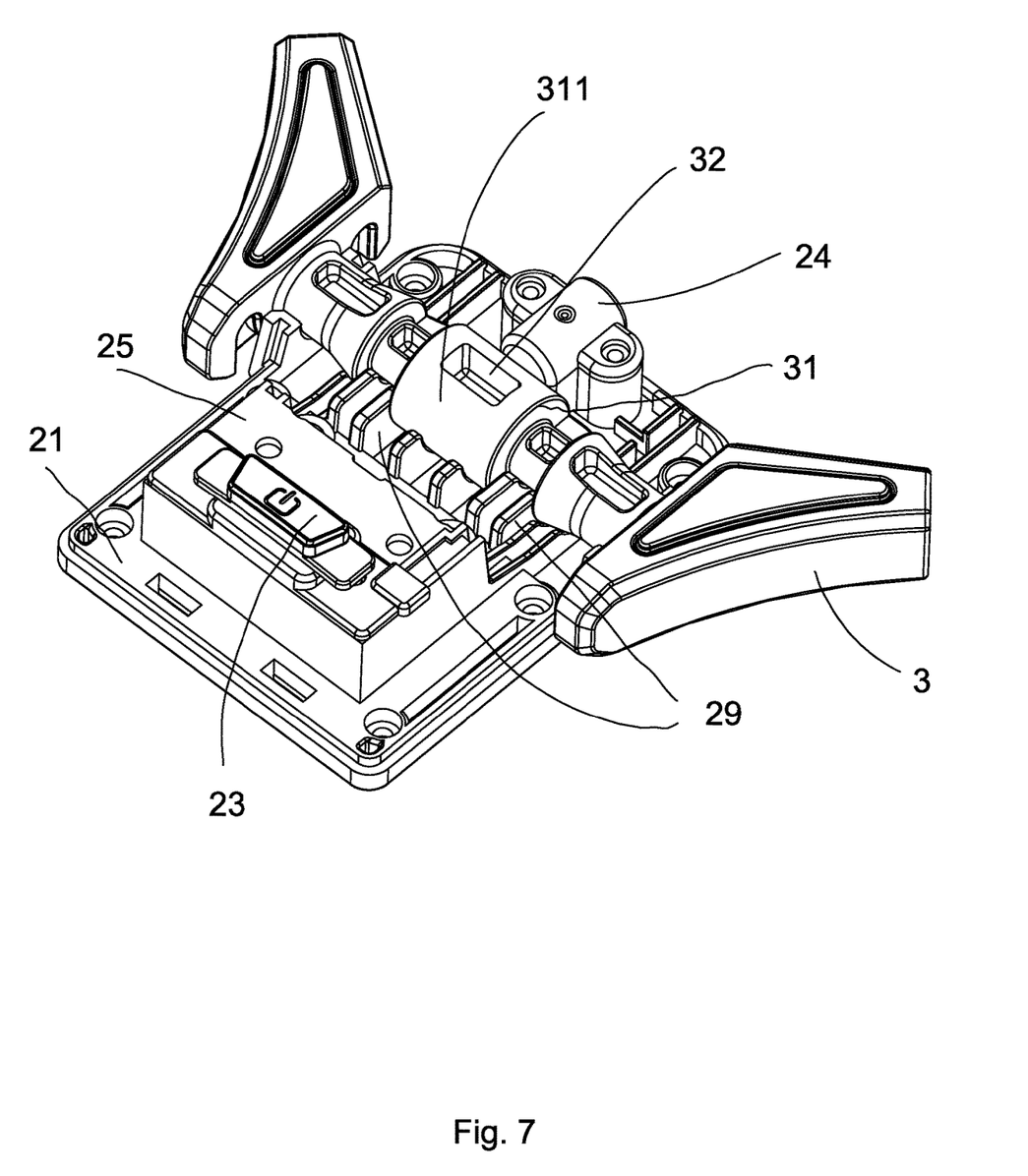
FIG. 7 is an internal view of a mounting base body of the connector after the buckle plate is removed. The meaning of the reference numerals: 1, handle; 2, connector; 3, net rack; 11, U-shaped support; 12, handle lever; 13, arm rest plate; 14, hanging plate; 15, through hole; 21, mounting base body; 22, lock structure; 23, control switch; 24, LED lamp; 25, battery case; 26, buckle plate; 27, battery case cover plate; 28, rotary shaft; 29, rotary pin bearing seat; 31, rotary pin; 32, clamping groove; 311—side wall of the rotary pin; 263—bottom surface of the buckle plate; 261—front end of the buckle plate; 262—rear end of the buckle plate; 264—reset spring; 265—bolt.

As shown in FIG. 1 and FIG. 4, the connector 2 comprises a mounting base body 21 fixed to the forefront the U-shaped support 11. A cavity is formed in the mounting base body 21. A plurality of rotary pin bearing seats 29 are arranged in the cavity side by side at intervals. Semicircular holes matched with a rotary pin are formed in the rotary pin bearing seats 29. A rotary pin 31 at the end of the net rack 3 is mounted in the semicircular holes in the rotary pin bearing seats 29. A mounting hole is formed in the upper surface of the mounting base body 21. A lock structure 22 is arranged at the mounting hole. The lock structure 22 comprises a buckle plate 26 hinged to the mounting base body 21 through a rotary shaft 28. The lock structure 22 is provided with a reset spring 264 and a bolt 265. The reset spring 264 and the bolt 265 are separately located at the rear end 262 and the front end 261 of the buckle plate 26. The tail end of the net rack 3 is hinged to the mounting base body 21 through the rotary pin 31. A clamping groove 32 is formed in the side wall 311 of the rotary pin 31 and is matched with the bolt 265 at the front end 261 of the buckle plate 26.

When the net rack 3 is completely unfolded, the lock structure 22 rotates into the clamping groove 32. When the net rack 3 is folded, the lock structure 22 is not buckled in the clamping groove 32. When the foldable dip net is used, the net rack 3 is pulled to rotate the rotary pin 31, and the clamping groove 32 rotates towards the buckle plate 26; when the clamping groove 32 overlaps with the bolt 265 of the buckle plate 26 in position, the reset spring 264 bounces upwards, the buckle plate 26 is buckled in the clamping groove 32, the net rack 3 cannot move anymore, and fish can be scooped. On the contrary, when the foldable dip net provided with the handle needs to be folded, the end, away from the net rack 3, of the buckle plate 26 is pressed by hand to counteract the acting force from the reset spring, then the end, clamped in the clamping groove 32, of the buckle plate 26 tilts, the rotary pin 31 is released by the lock structure 22, and then the net rack 3 can be pulled to be folded.

As shown in FIG. 1, FIG. 3 and FIG. 4, the connector 2 is of an airtight waterproof structure. A light-emitting unit is arranged in a cavity of the connector 2 and comprises a battery, a control switch 23, a control chip and an LED lamp 24. The LED lamp 24 is fixedly mounted at the front end of the mounting base body 21. The control switch 23 is arranged on the upper surface of the mounting base body 21. A battery case 25 is arranged in the mounting base body 21. A battery case cover plate 27 is arranged on the back of the battery case 25. The battery case cover plate 27 is screwed on the battery box 25 with screws. When the battery needs to be replaced with a new one, the battery case cover plate 27 is detached from the battery case 25 by unscrewing the screws. The battery and the control chip are both mounted in the battery case 25. The battery, the control switch 23, the control chip and the LED lamp 24 are sequentially connected through a wire. The battery is a 9V instrument battery and is able to continuously supply voltage-reduced power to the LED lamp 24 for 120 hours. The control chip is an EN8F202 LED-drive single-chip microcomputer chip and is able to control the LED lamp to emit different lights. For instance, if the control switch 23 is pressed once, the LED lamp emits a near light; if the control switch 23 is pressed twice, the LED lamp emits a distant light; if the control switch 23 is pressed three times, the LED lamp emits a scattered light; if the control switch 23 is pressed four times, the LED lamp emits a continuously-twinkling light; and if the control switch 23 is pressed five times, the LED lamp is turned off. The LED lamp can also be set through the control chip to be automatically turned off under the condition where the control switch 23 is not pressed within 5-10 minutes.

A method for using the foldable dip net provided with the handle comprises the following steps: the net rack 3 is locked by the lock structure 22 after being unfolded, and a user holds the handle lever 12 from below with the palm facing upwards and the back of the arm leaning against the upper surface of the arm rest plate 13 and then shakes the forearm to apply an acting force to the dip net to scoop fish. According to the lever principle, fish can be scooped more effortlessly by applying the acting force to the net rack under the combined effect of the wrist and the arm, and the fish scooping angle can be controlled more easily, and fish can be scooped more accurately; because the arm rest plate 13 is matched with the contour of the arm, the contact area between the arm and the arm rest plate 13 is enlarged, the user feels more comfortable and is protected against arm pains. When fishing at night, the user can cooperatively use the light-emitting unit to clearly see the condition under water and to attract fish.

The present invention is expounded above with reference to embodiments, but these embodiments are only preferred ones and are not intended to limit the implementation scope of the present invention. All equivalent transformations and improvements achieved without deviating from the application scope of the present invention should also fall within the protection scope of the present invention.

The invention claimed is:

1. A method for using a foldable dip net provided with a handle, consisting of the following steps in the following order:
   unfolding a net rack;
   locking the net rack by a lock structure after the net rack is unfolded;
   holding a handle lever from below with a palm facing upwards and the back of an arm leaning against an upper surface of an arm rest plate;
   pressing a control switch once;
   pressing the control switch twice;
   pressing the control switch three times;
   pressing the control switch four times;
   pressing the control switch five times;
   applying an acting force to the dip net provided with the handle;
   inserting the dip net into water;
   taking the dip net out of water;
   pressing a buckle plate; and
   folding the net rack;
   wherein the foldable dip net provided with the handle, comprising the handle, a connector and the net rack, wherein the handle comprises a U-shaped support, the handle lever is arranged at a first end of the U-shaped support, and the arm rest plate is arranged at a second end of the U-shaped support; the second end of the U-shaped support being distal to the net rack than the first end of the U-shaped support; the connector comprises a mounting base body fixed to the first end of the U-shaped support, and the lock structure is arranged on the mounting base body; and an end of the net rack is hinged to the mounting base body through a rotary pin, a clamping groove aligned with the lock structure is formed in a side wall of the rotary pin, and the net rack is locked on the mounting base body through the lock structure;
   wherein the connector is an airtight and waterproof structure;
   wherein the lock structure comprises the buckle plate, a middle of the buckle plate is hinged to the mounting base body through a rotary shaft, a reset spring and a bolt are arranged on a bottom surface of the buckle plate and are respectively located on a rear end and a front end of the buckle plate, the reset spring has two ends separately making contact with the buckle plate and the mounting base body, and the bolt has a top fixed to a bottom surface of the buckle plate and a bottom aligned with the clamping groove such that when the net rack is unfolded, the bottom of the bolt engages with the clamping groove;
   wherein the net rack is rotatably connected with the mounting base body through the rotary pin rotatably mounted in at least one rotary pin bearing seat arranged in the mounting base body;
   wherein a light-emitting unit is arranged in the mounting base body and comprises a battery, a control switch and an LED lamp, the LED lamp is fixed to a forefront of the mounting base body, the control switch is arranged on an upper surface of the mounting base body, the battery is mounted in the mounting base body, and the battery, the control switch and the LED lamp are operatively connected;
   wherein a battery case is arranged in the mounting base body and is provided with a battery case cover plate, the battery case cover plate is located at a bottom of the mounting base body and is fixed to the mounting base body with screws, and the battery is mounted in the battery case;
   wherein a hanging plate is arranged behind the arm rest plate and is provided with a through hole;
   wherein the light-emitting unit further comprises a control chip adjusting brightness of the LED lamp, and the control chip is connected between the control switch and the LED lamp; and
   wherein the battery is a 9V instrument battery and continuously supplies voltage-reduced power to the LED lamp for 120 hours, the control chip is an EN8F202 LED-drive single-chip microcomputer chip and controls the LED lamp to emit different lights such that, when the control switch is pressed once, the LED lamp emits a near light; when the control switch is pressed twice, the LED lamp emits a distant light; when the control switch is pressed three times, the LED lamp emits a scattered light; when the control switch is pressed four times, the LED lamp emits a continuously-twinkling light; when the control switch is pressed five times, the LED lamp turns off; and when the control switch is not pressed for 5-10 minutes, the LED lamp turns off.

* * * * *